United States Patent
Rajasekaran et al.

(10) Patent No.: US 12,507,832 B2
(45) Date of Patent: Dec. 30, 2025

(54) COOKWARE WITH UTENSIL RETAINER

(71) Applicant: E. MISHAN & SONS, INC., New York, NY (US)

(72) Inventors: Mohan Rajasekaran, Watertown, CT (US); Steven Mishan, New York, NY (US)

(73) Assignee: E. Mishan & Sons, Inc., New York, NY (US)

( * ) Notice: Subject to any disclaimer, the term of this patent is extended or adjusted under 35 U.S.C. 154(b) by 669 days.

(21) Appl. No.: 17/993,306

(22) Filed: Nov. 23, 2022

(65) Prior Publication Data

US 2024/0164587 A1    May 23, 2024

(51) Int. Cl.
*A47J 43/28* (2006.01)
*A47J 36/06* (2006.01)
*A47J 36/08* (2006.01)

(52) U.S. Cl.
CPC ........... *A47J 43/287* (2013.01); *A47J 36/064* (2022.01); *A47J 36/08* (2013.01)

(58) Field of Classification Search
CPC ................................................. A47J 43/287
See application file for complete search history.

(56) References Cited

U.S. PATENT DOCUMENTS

| | | | |
|---|---|---|---|
| 1,464,731 A | 8/1923 | Smith | |
| 1,554,887 A | 9/1925 | Smith | |
| 5,105,963 A | 4/1992 | Scott | |
| 5,666,874 A | 9/1997 | Wang | |
| 5,678,790 A | 10/1997 | Dwyer | |
| 5,897,020 A | 4/1999 | Liu | |
| 5,924,592 A | 7/1999 | Hieronymus | |
| 6,032,822 A | 3/2000 | Munari | |
| 7,600,654 B2 | 10/2009 | Kutsch et al. | |
| 7,802,702 B2 | 9/2010 | Archer, Jr. | |
| D680,808 S | 4/2013 | Montgomery | |
| D684,815 S | 6/2013 | Chen | |
| D684,816 S | 6/2013 | Chen | |
| D685,223 S | 7/2013 | Montgomery | |
| D688,515 S | 8/2013 | Montgomery | |
| D688,916 S | 9/2013 | Montgomery | |

(Continued)

FOREIGN PATENT DOCUMENTS

| CA | 147137 | 3/2013 |
|---|---|---|
| CA | 2749842 C | 9/2016 |

(Continued)

*Primary Examiner* — John J Norton
(74) *Attorney, Agent, or Firm* — Notaro, Michalos & Zaccaria P.C.

(57) ABSTRACT

A set of range-top cookware has a vessel, a lid, and a utensil having a handle and a tool. The vessel has a utensil rest, a utensil slot and a pour spout formed in the rim of the vessel. The utensil is adapted to lay crosswise on the rim of the vessel, constrained by utensil rest and the utensil slot. The vessel has a handle which is not in line with the utensil rest, utensil slot, or pour spout. The lid has a rim with a utensil tool gap and a utensil handle gap, the utensil tool gap disposed and adapted to overlay the utensil tool, and the utensil handle gap disposed and adapted to overlay the utensil handle while it is received in the utensil handle slot. The lid rim has a strainer disposed to strain material poured from the pour spout.

20 Claims, 11 Drawing Sheets

(56) References Cited

U.S. PATENT DOCUMENTS

| | | | |
|---|---|---|---|
| D690,154 S | 9/2013 | Montgomery | |
| 8,746,497 B2 | 6/2014 | Bourbeau et al. | |
| D731,231 S | 6/2015 | Steininger | |
| D916,547 S | 4/2021 | Tehrani et al. | |
| D929,798 S | 9/2021 | Tehrani et al. | |
| 2007/0289981 A1 | 12/2007 | Shaw | |
| 2008/0295343 A1 | 12/2008 | Mattingly et al. | |
| 2012/0298664 A1 | 11/2012 | DeVolpi | |
| 2016/0066743 A1 | 3/2016 | Prommel et al. | |
| 2018/0368625 A1 | 12/2018 | Wada et al. | |
| 2021/0015291 A1 | 1/2021 | Tehrani et al. | |
| 2021/0186264 A1 | 6/2021 | Nevarez | |
| 2022/0133082 A1* | 5/2022 | Tehrani | A47J 36/06 220/573.1 |
| 2022/0322886 A1* | 10/2022 | Olsen | A47G 21/145 |

FOREIGN PATENT DOCUMENTS

| | | | | |
|---|---|---|---|---|
| CA | 192619 | | 7/2021 | |
| CN | 202044097 U | | 11/2011 | |
| CN | 102973127 A | | 3/2013 | |
| CN | 109463981 A | | 3/2019 | |
| DE | 3525283 A1 | * | 1/1987 | ............ A47J 37/1204 |
| EM | 001284871-0004 | | 7/2011 | |
| EM | 002241554-0002 | | 5/2013 | |
| EM | 004689511-0009 | | 2/2018 | |
| EM | 007538731-0001 | | 1/2020 | |
| EM | 007538731-0002 | | 1/2020 | |
| EM | 007538731-0003 | | 1/2020 | |
| EM | 008202295-0001 | | 10/2020 | |
| EM | 008202295-0002 | | 10/2020 | |
| EM | 008202295-0003 | | 10/2020 | |
| EM | 008202295-0004 | | 10/2020 | |
| EP | 0802759 B1 | | 8/1999 | |
| EP | 2509481 B1 | | 8/2014 | |
| GB | 310470 | | 7/1930 | |
| GB | 2121672 B | | 12/1985 | |
| GB | 2285211 A | | 7/1995 | |
| JP | 52132963 | | 11/1977 | |
| KR | 200469890 | | 11/2013 | |
| WO | WO-2023208420 A1 | * | 11/2023 | .............. A47J 36/00 |

* cited by examiner

COOKWARE WITH UTENSIL RETAINER

FIELD AND BACKGROUND OF THE SUBJECT TECHNOLOGY

The subject technology relates to improvements in range-top cookware for household or commercial use.

A U.S. design patent application filed on the same day as this utility patent application, titled "COOKWARE WITH UTENSIL RETAINER," in the name of the present inventors, Ser. No. 29/860,920 is incorporated herein by reference for all purposes.

SUMMARY OF THE SUBJECT TECHNOLOGY

The subject technology concerns range-top cookware sets, including a vessel, lid, and utensil, which have novel structures for storing the utensil on the rim of the cookware, under the lid.

In a non-limiting embodiment of the subject technology, a set of range-top cookware for household or commercial use comprises a cookware vessel comprising a containing portion, a rim about an upper edge of the containing portion, a first handle attached at a first side of the cookware vessel, a utensil rest disposed at the upper edge of the containing portion and extending outwardly and having a floor and an outer perimeter, the rim extending around the outer perimeter, a utensil slot disposed at the upper edge of the containing portion at a position opposite the utensil rest, and a pour spout; and utensil having a utensil handle and a utensil tool disposed at an end of the utensil handle, and a utensil handle slot extending across a width of the utensil handle, wherein the utensil is adapted to lay crosswise on the rim of the cookware vessel, in which position the utensil tool is received by the utensil rest and is constrained by the floor and the portion of the rim extending around the outer perimeter of the utensil rest, the utensil handle is received by the utensil slot, and the utensil handle slot overlays the rim of the cookware vessel at the utensil slot, so that the utensil is substantially prevented from side-to-side movement or longitudinal movement on the cookware vessel; and a lid adapted to cover the cookware vessel, the lid comprising a downward-extending lid rim, the lid rim formed with a utensil tool gap and a utensil handle gap opposite the utensil tool gap, the utensil tool gap disposed and adapted to overlay the utensil tool while it is received in utensil rest, and the utensil handle gap disposed and adapted to overlay the utensil handle while it is received in the utensil handle slot, thereby further constraining and retaining the utensil in position on the cookware vessel, the lid rim also formed with a strainer which is disposed and adapted to align with pour spout when the lid is placed on the cookware vessel.

The cookware vessel, lid, and utensil, each separately or as part of a set, are within the scope of the subject technology.

In embodiments, a second handle may be attached to the cookware vessel opposite the first handle.

In embodiments, the first handle is aligned along a first line, the utensil rest and utensil slot are aligned along a second line that is not co-linear with the first line, and the pour spout is aligned along a third line that is not co-linear with the first line or the second line. The first line, second line and third line may intersect at a center of the cookware vessel. The second line and third line may be orthogonal.

In embodiments, a wire mesh basket is adapted to nest within the containing portion of the vessel, beneath the utensil.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE SUBJECT TECHNOLOGY

Figure 1:
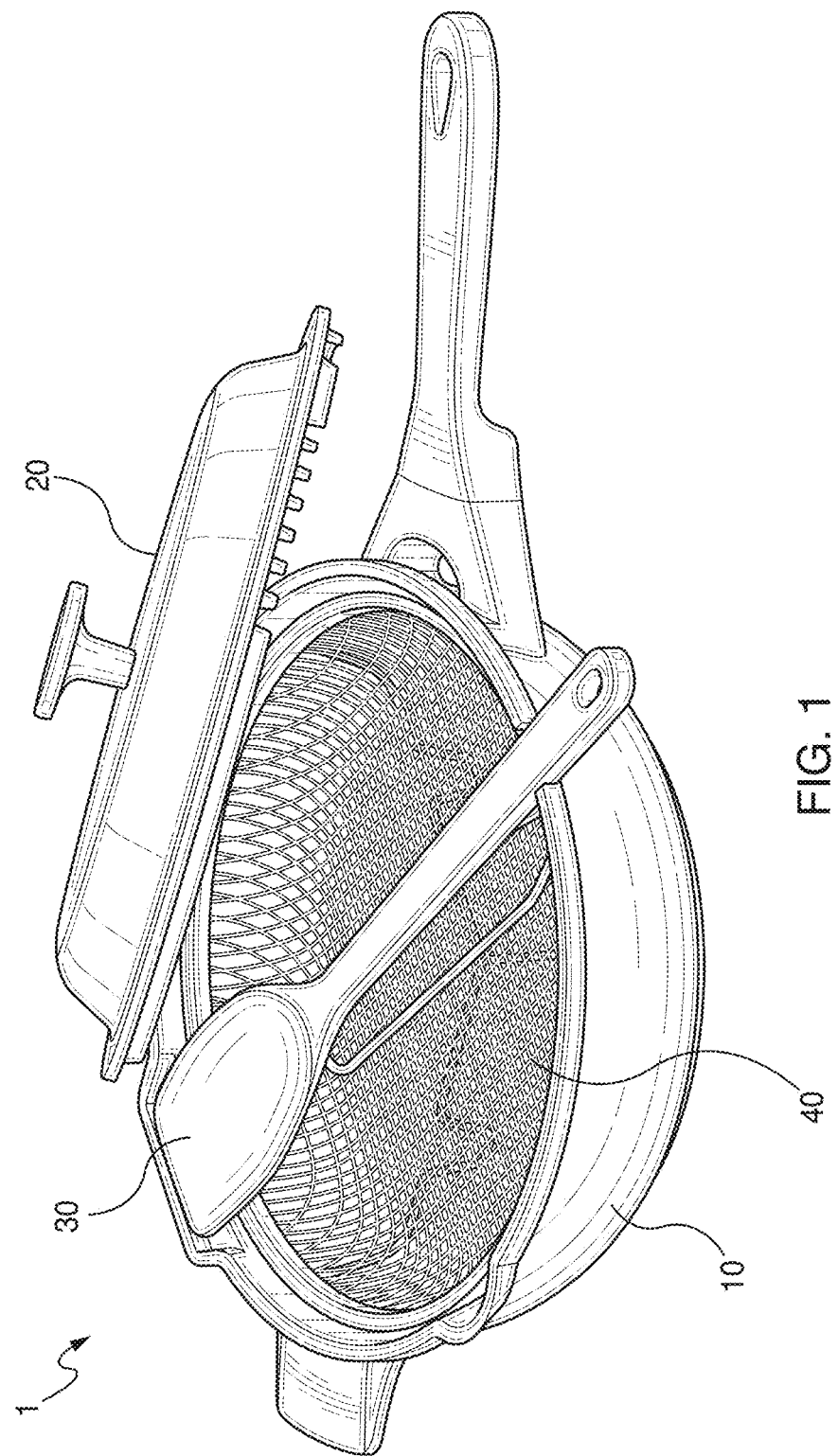
FIG. 1 is a perspective view of a cookware set according to a non-limiting embodiment of the subject technology.
Figure 2:
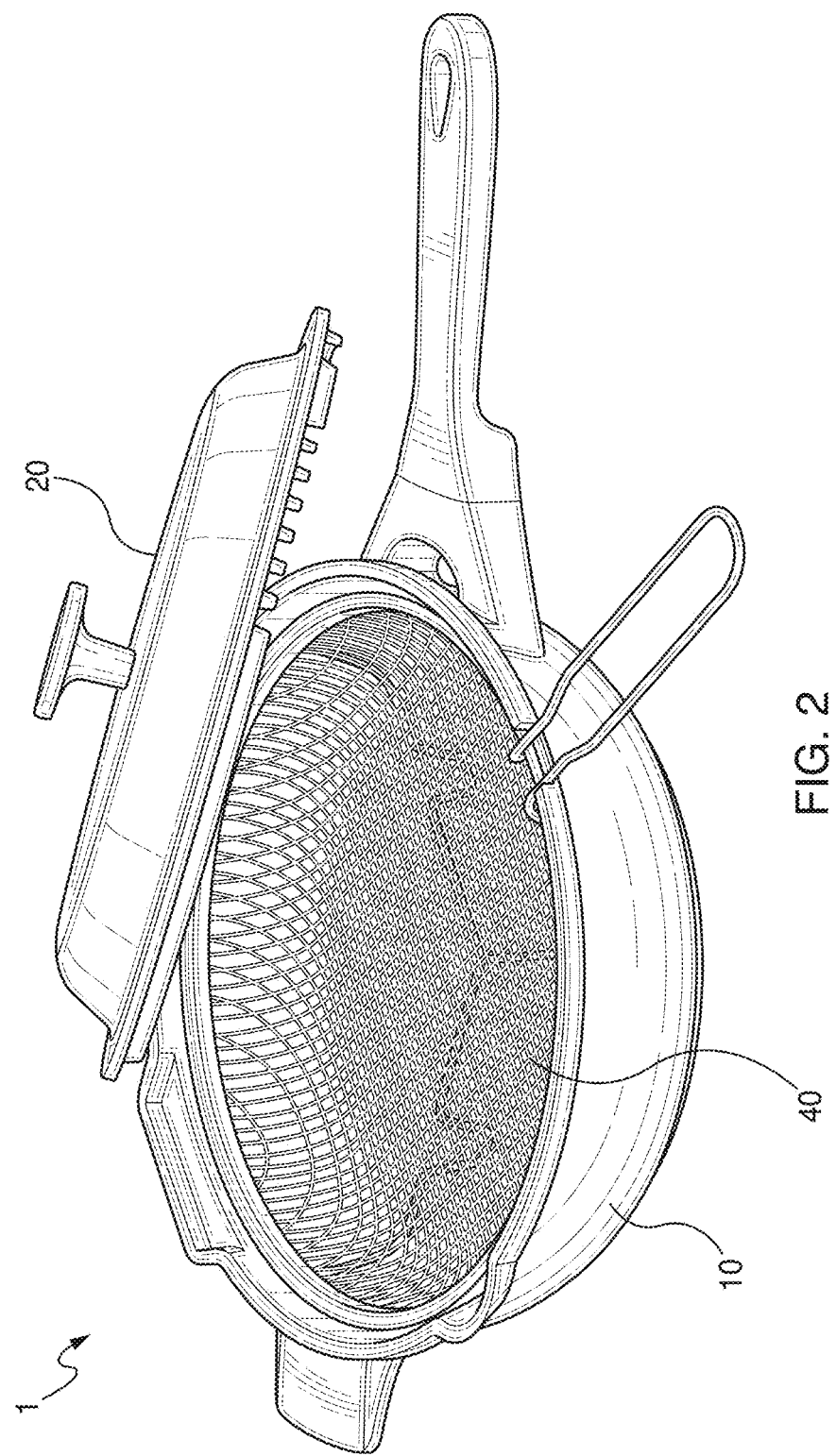
FIG. 2 is a perspective view of the cookware set of FIG. 1 with the utensil removed.
Figure 3:
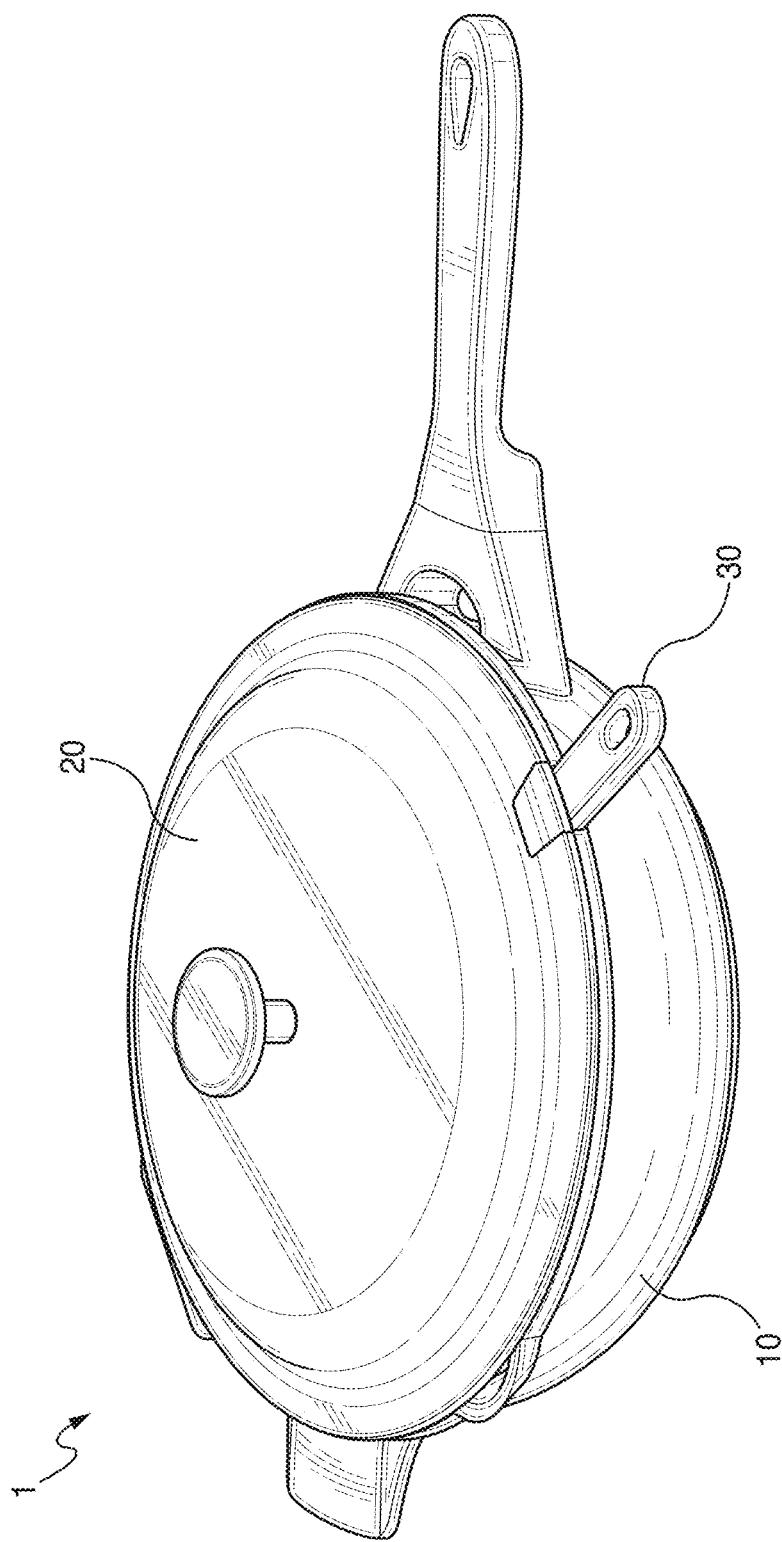
FIG. 3 is a perspective view of the cookware set of FIG. 1.
Figure 4:
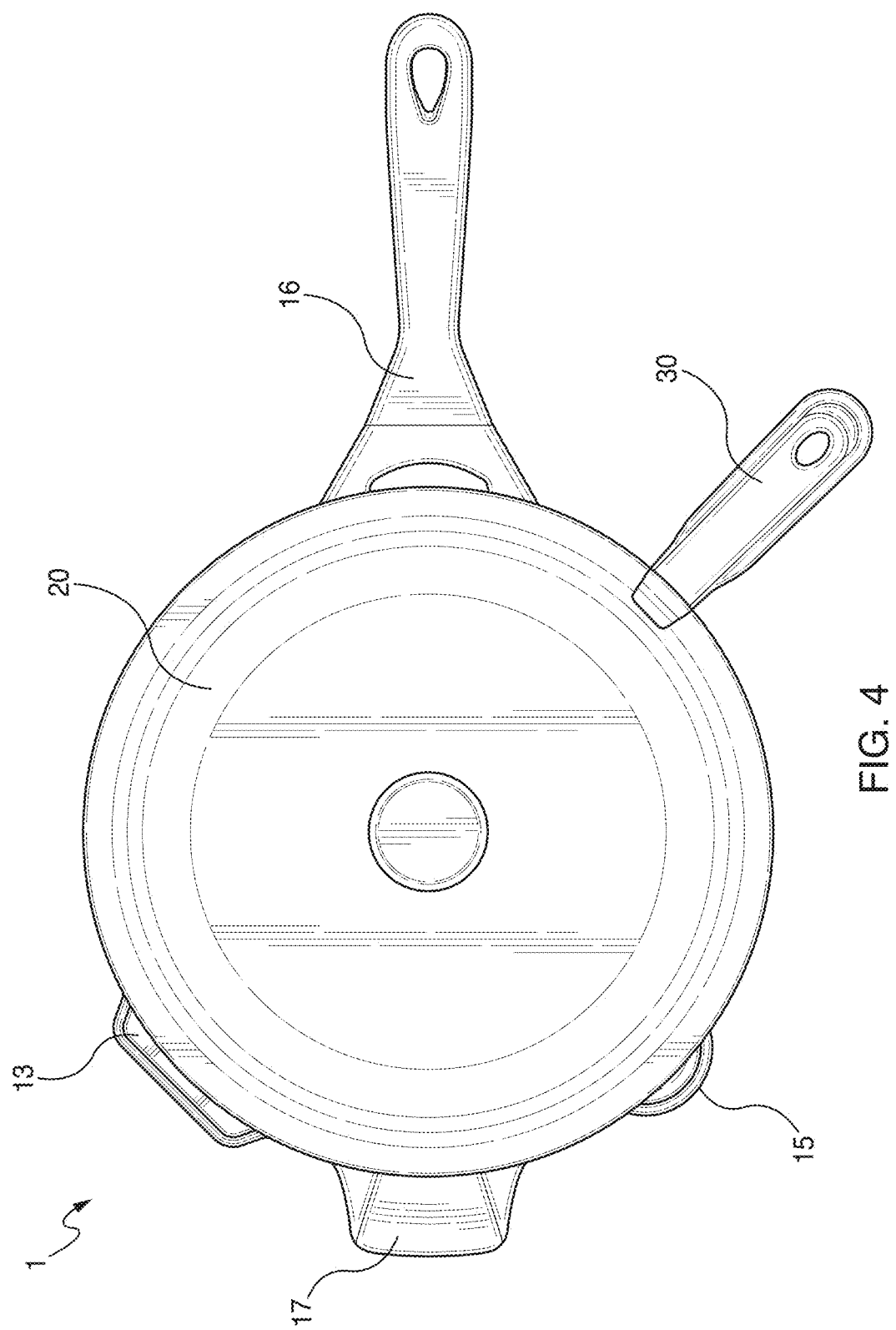
FIG. 4 is a top plan view of a cookware set according to a non-limiting embodiment of the subject technology.
Figure 5:
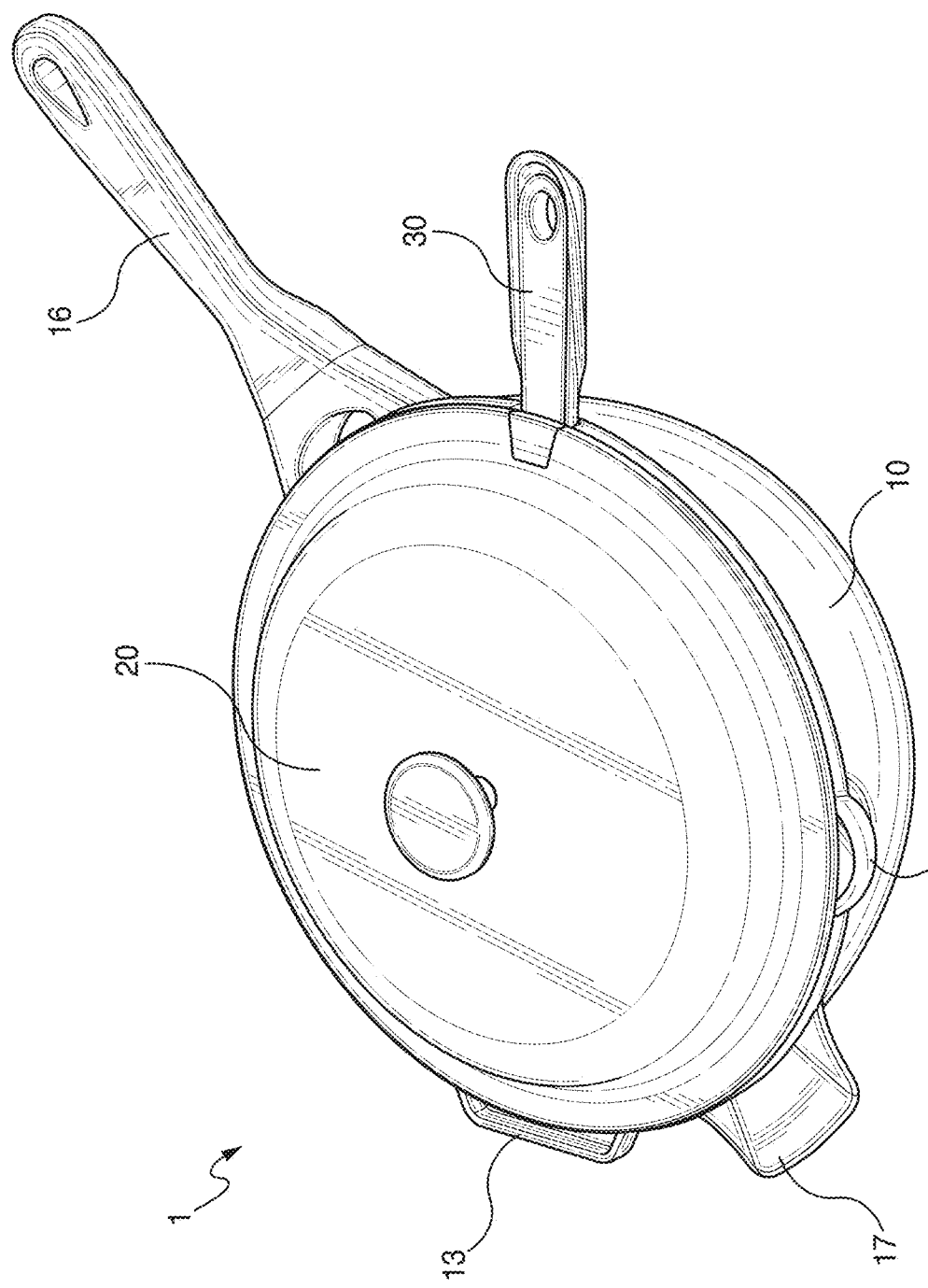
FIG. 5 is a perspective view of the cookware set of FIG. 4.

According to an embodiment of the subject technology, cookware set 1 comprises cookware vessel 10, lid 20, utensil 30, and optionally basket 40.

Figure 6:
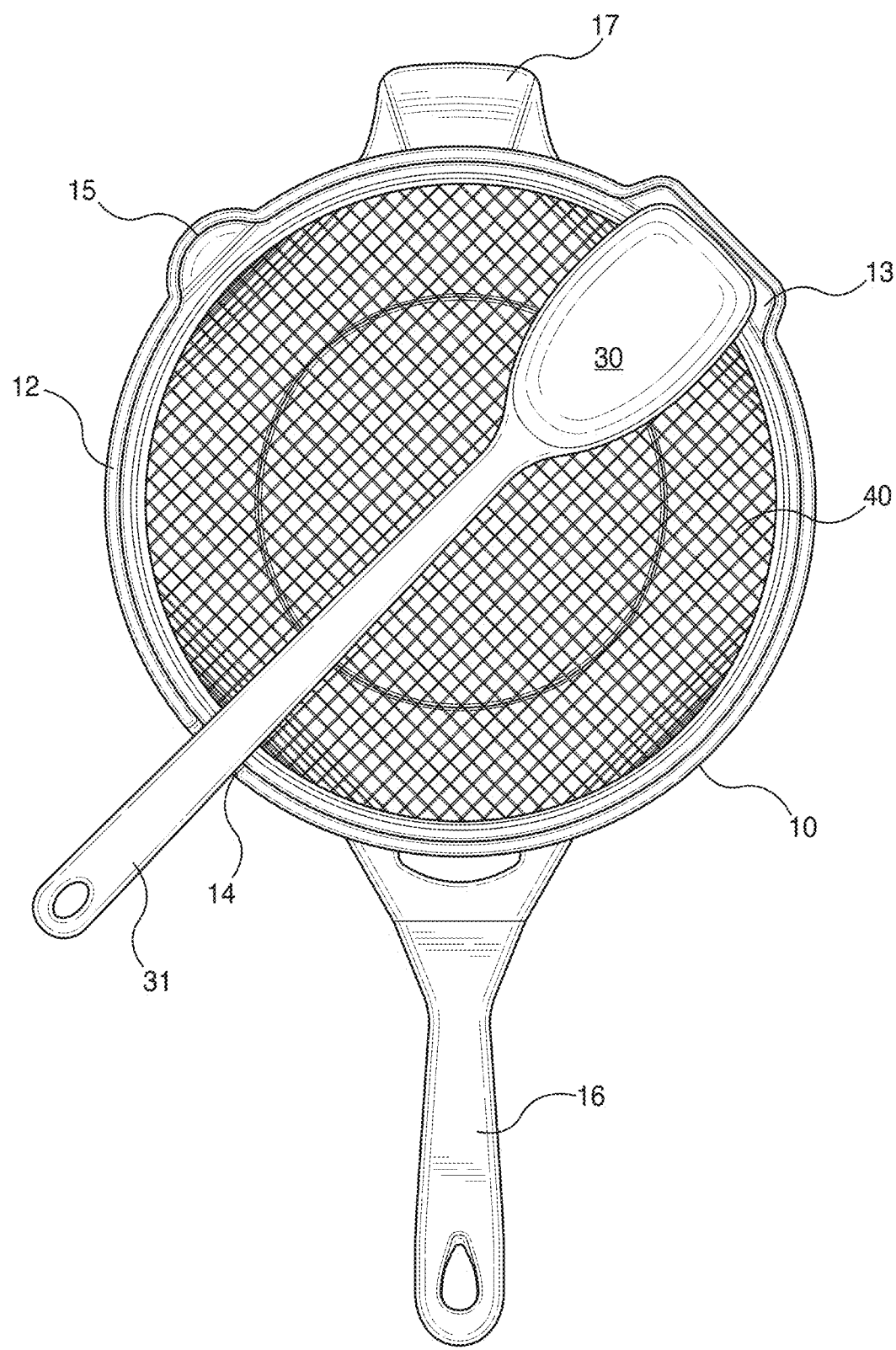
FIG. 6 is a top plan view of the cookware set of FIG. 4 with the lid removed.
Figure 7:
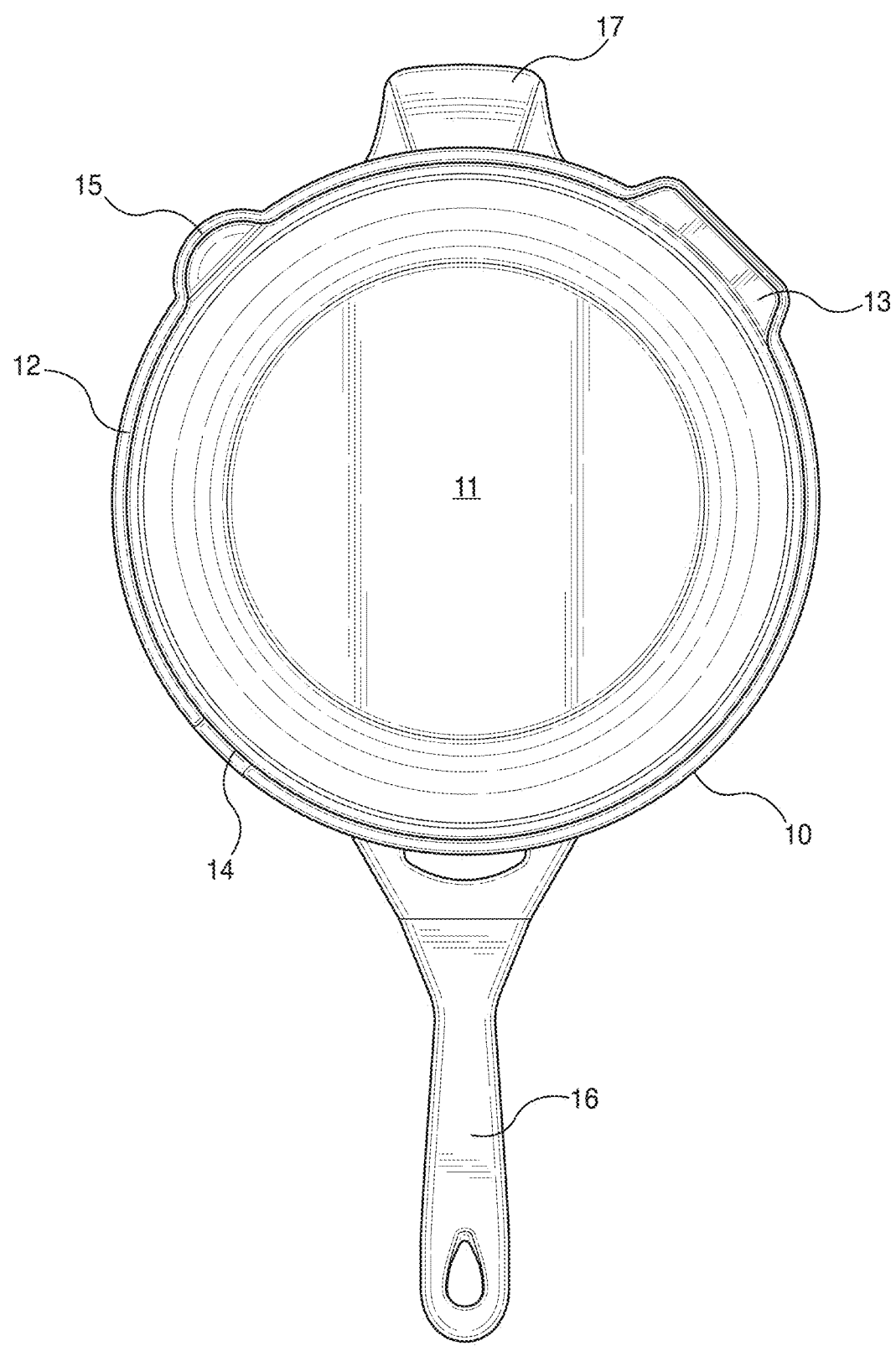
FIG. 7 is a top plan view of the cookware set of FIG. 4 with the lid and basket removed.

Cookware vessel 10, as shown in the Figures, may be a pot, pan, or any other similar range top cooking vessel. As best seen in FIGS. 6 and 7, cookware vessel 10 comprises a containing portion 11 for containing food for cooking, rim 12 at the upper edge of containing portion 11, and at least one handle for manipulating cookware vessel 10. In the embodiment shown, cookware vessel 10 is provided with two opposing handles, a stick handle 16 and a grab handle 17, however, other handle arrangements are within the scope of the subject technology, for example, a single stick handle, or two grab handles. In the embodiment shown, cookware vessel 10 is also formed with pour spout 15 for pouring material out of containing portion 11. Also, in the embodiment shown, cookware vessel 10 is formed with utensil rest 13 and, on the opposite side of cookware vessel 10, utensil slot 14, which cooperate with features of lid 20 and utensil 30 as will be explained. Notably, rim 12 of cookware vessel 10 extends around the outer perimeter of utensil rest 13.

Figure 10:
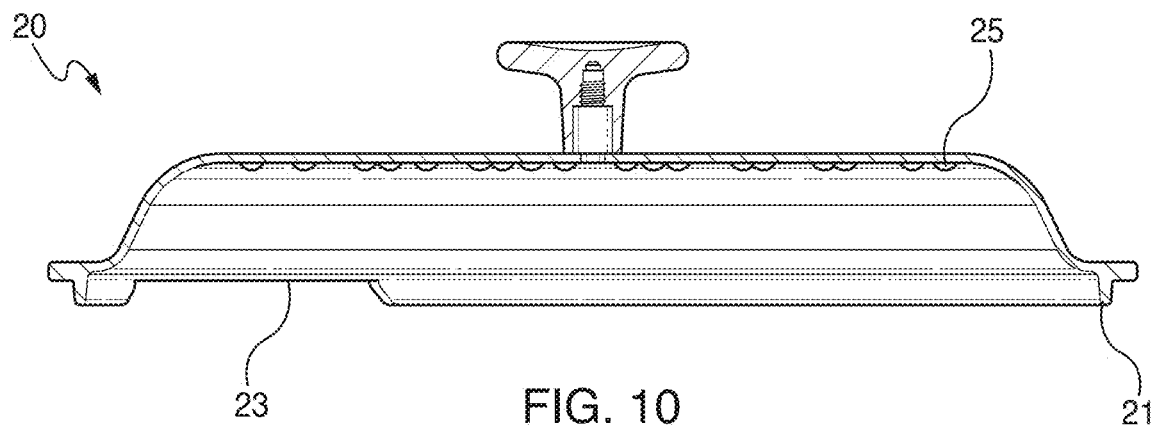
FIG. 10 is a cross-sectional view of a lid for a cookware vessel according to a non-limiting embodiment of the subject technology.
Figure 11:
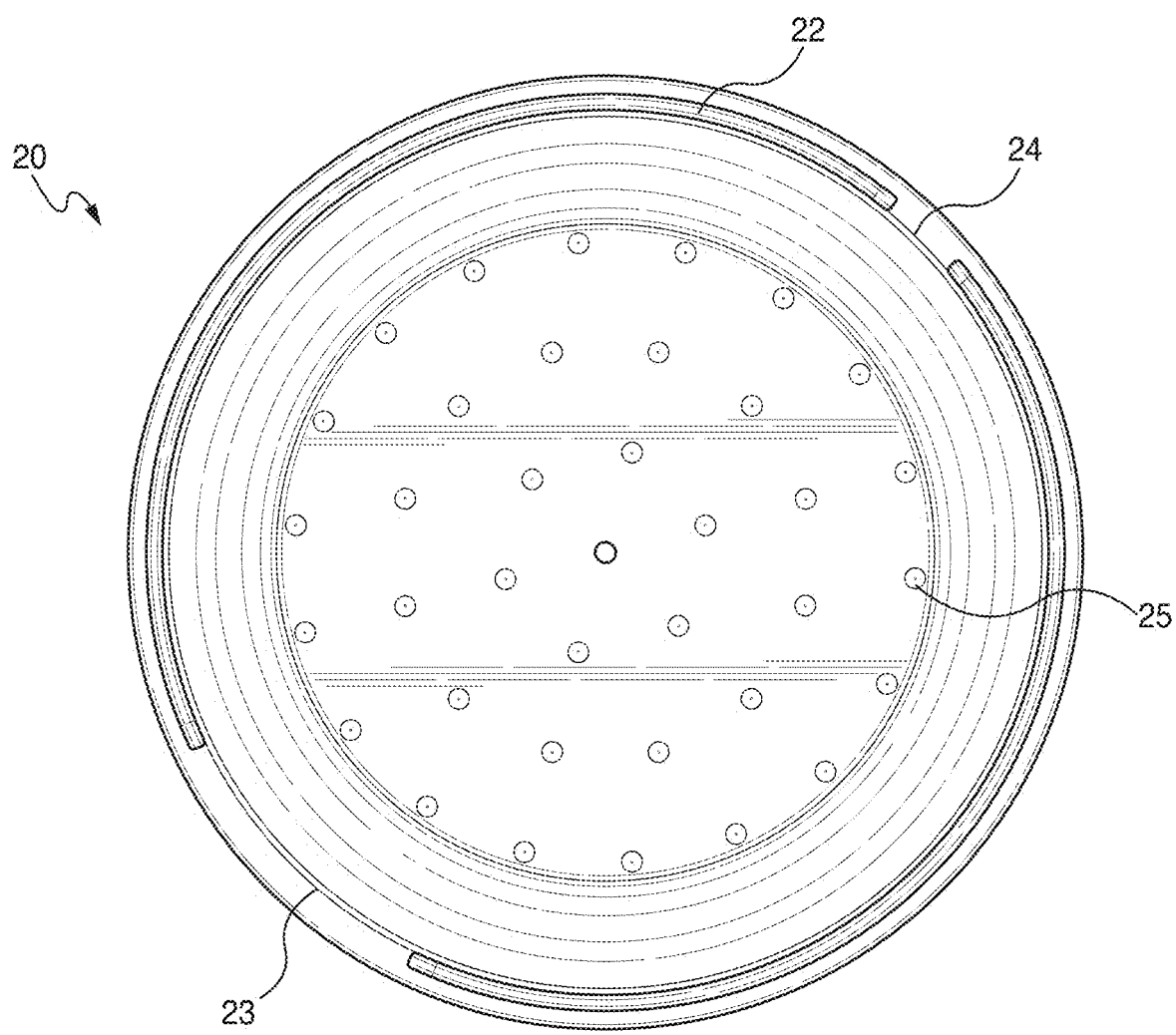
FIG. 11 is a bottom view of the lid of FIG. 10.

Lid 20 is adapted to fit on cookware vessel 10 to cover containing portion 10. As best seen in FIGS. 10 and 11, lid 20 has downward-extending lid rim 21 which is adapted to fit within rim 12 of cookware vessel 10. Lid rim 21 has formed therein strainer 22, utensil tool gap 23, and utensil handle gap 24, which cooperate with features of cookware vessel 10 and utensil 30 as will be explained. In the non-limiting embodiment shown, lid 20 has bumps 25 formed on the inner surface of lid 20, to collect and direct condensed steam for return into the containing portion 11 of cookware vessel 10. Bumps 25 underneath the lid surface collect the liquid condensation during the cooking process and then the condensate vapors drips down evenly from the protrusions onto the foot in cookware vessel 10 thereby keeping the cooking food moist. Without the bumps 25 spread evenly throughout the lid underside, the moisture would collect and fall more randomly causing some wet and dry spots in the food.

Figure 12:
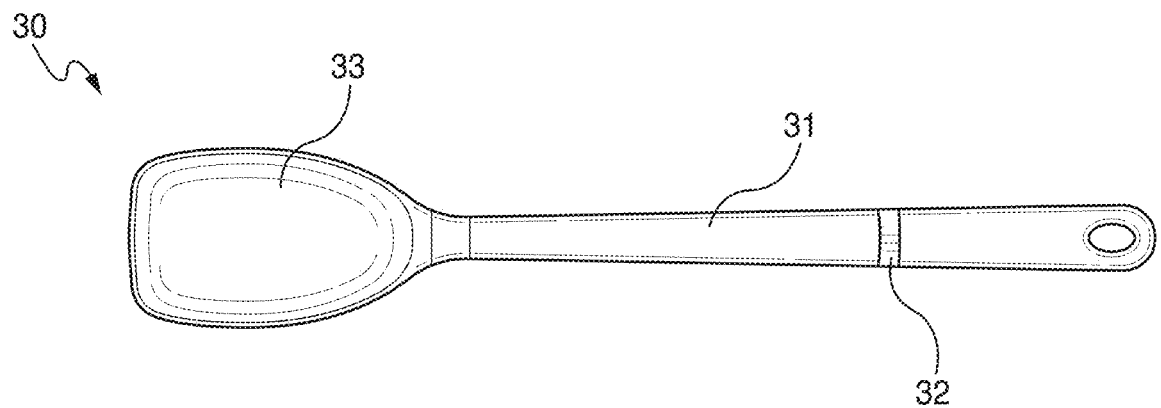
FIG. 12 is a bottom view of a utensil according to a non-limiting embodiment of the subject technology.
Figure 13:
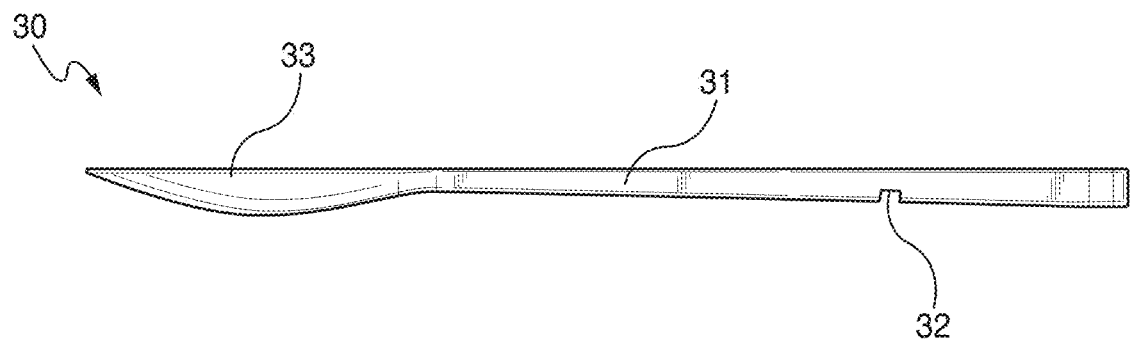
FIG. 13 is a side, plan view of the utensil of FIG. 12.

Utensil 30 may be for example a spatula, spoon, spoonula, fork, turner, flipper, or similar long-handled utensil. As best seen in FIGS. 12 and 13, utensil 30 has utensil handle 31, and utensil tool 33 at an end of utensil handle 31, which may be a bowl in the case of a spoon, tines in the case of a fork, a silicone scraper in the case of a spatula, or other utensil tool appropriate for the type of utensil 30. Utensil handle 31 has formed therein a utensil handle slot 32, which interoperates with features of cookware vessel 10, as will be explained.

According to a further aspect of the subject technology, cookware vessel 10, lid 20, and utensil 30 are provided with structures to accommodate utensil 30 on cookware vessel 10, and beneath lid 20 when lid 20 is placed on cookware vessel 10. Utensil rest 13 is adapted to receive utensil tool 33 of utensil 30. As shown for example in the Figures, preferably utensil rest 13 and utensil tool 33 are adapted so there is not too much room between the perimeter of utensil tool 33 and the portion of rim 12 which extends around the perimeter of utensil rest 13. Similarly, utensil slot 14 is adapted to receive utensil handle 31 without too much room on either side of utensil handle 31. Utensil handle slot 32 is positioned and adapted to overlay rim 12 at utensil slot 14. Thus, utensil 30 may be laid crosswise on the rim 12 of cookware vessel 10, with utensil tool 33 received in utensil rest 12, and utensil handle 31 received in utensil slot 14. Additionally, at utensil slot 14, rim 12 is received in utensil handle slot 32. This engagement between vessel 10 and utensil 30 substantially prevents side-to-side or longitudinal movement of utensil 30 on vessel 10, by which is meant, it cannot move more than 5 mm.

Additionally, features of lid 20 are adapted to interoperate with utensil 30. Specifically, utensil tool gap 23 in lid rim 21 is disposed and adapted to overlay utensil tool 33 while it is received in utensil rest 13. On the opposite side of lid rim 21, utensil handle gap 24 is disposed and adapted to overlay utensil handle 31 while it is received in utensil handle slot 32. Thus, when lid 20 is placed on cookware vessel 10, these features further constrain and retain utensil 30 in position on cookware vessel 10.

Additionally, strainer 33 formed in lid rim 21 is disposed and adapted to self-align with pour spout 15 of cookware vessel 10 when lid 20 is placed on vessel 10. The self-alignment is due to the disposition of utensil tool gap 23 and utensil handle gap 24 in lid rim 21, which ensures that the lid 20 must be placed on vessel 10 in the correct orientation (at least when utensil 30 is also present). Thus, when lid 20 is in place on cookware vessel 10, the entire assembly can be manipulated to pour liquid through strainer 33 and pour spout 15, retaining solids in the containing portion 11.

Figure 8:
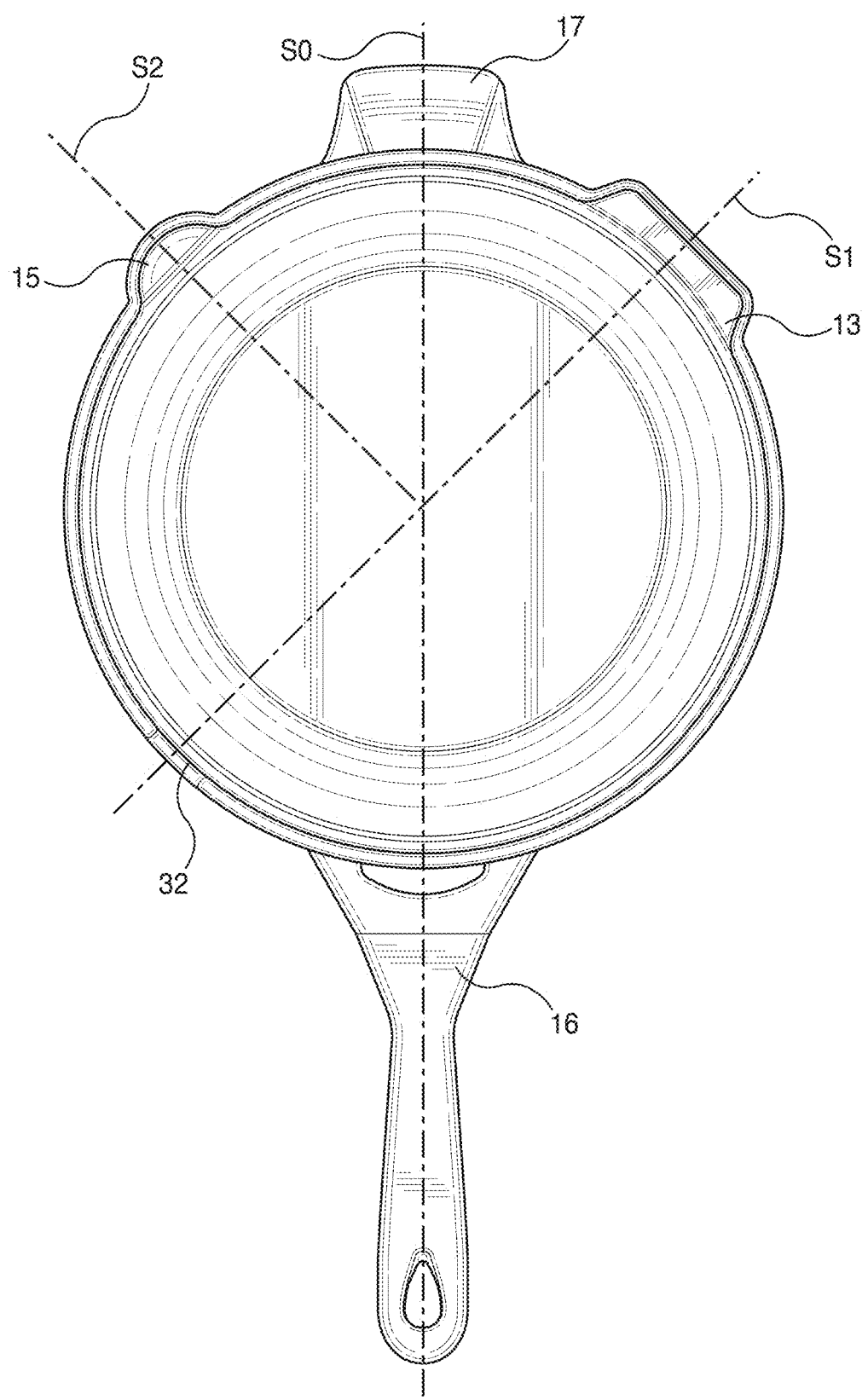
FIG. 8 is a top plan view of the cookware set of FIG. 4 with the lid and basket removed, and orientation lines added.
Figure 9:
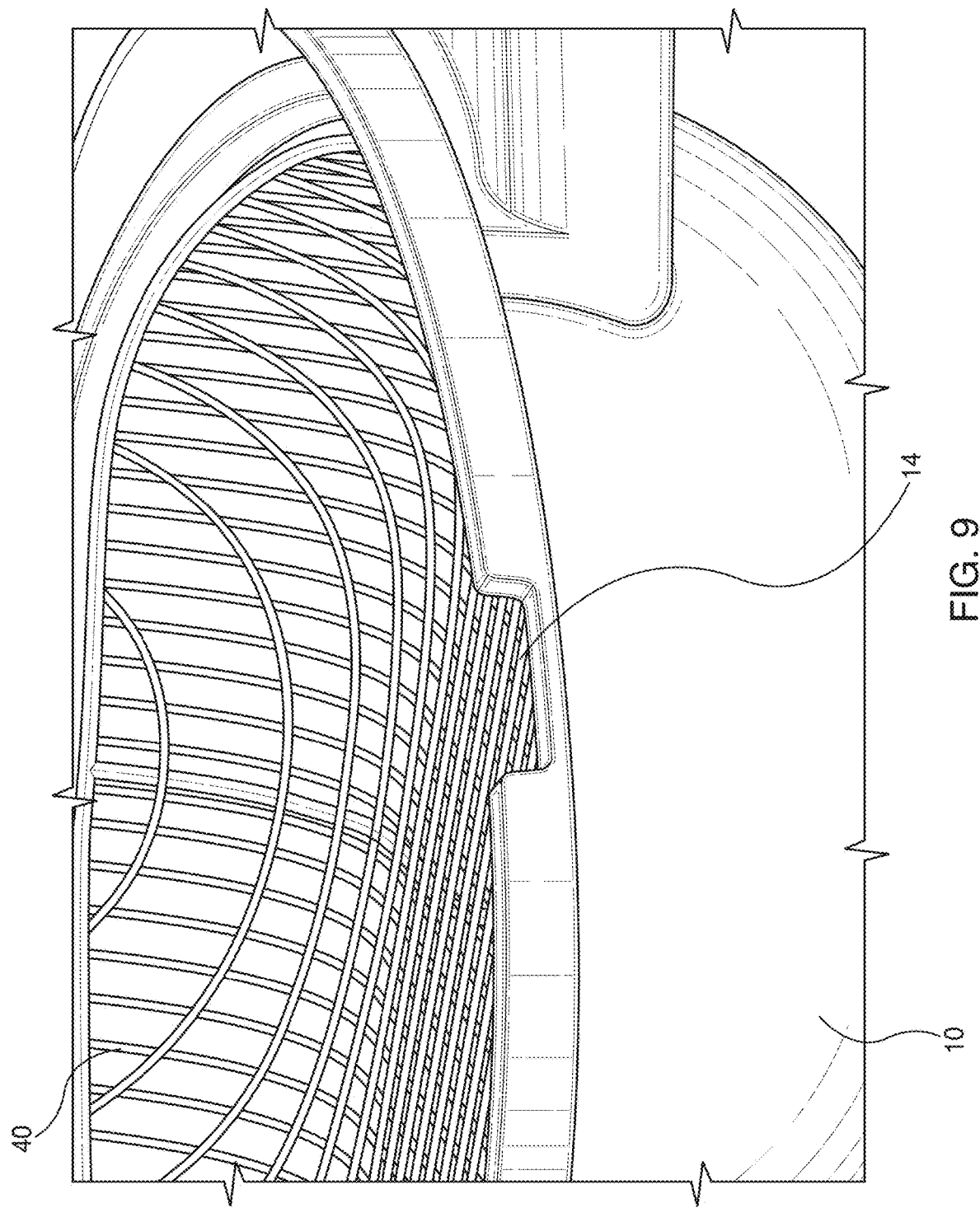
FIG. 9 is a detail view of a cookware vessel with utensil slot according to a non-limiting embodiment of the subject technology.

As best seen in FIG. 8, in the embodiment shown in the Figures, handles 16, 17 are disposed along line 50, and utensil rest 13 and utensil handle slot 32 are disposed along a line 51 which intersects line 50. Due to this structure, utensil 30 is retained in a position which does not interfere with use of handles 16, 17. Additionally, pour spout 15 is disposed along a line 52 which intersects line 50 of handles 16, 17. Lines 50, 51, 52 cross at the center of the cookware vessel 10. In the embodiment shown, each of these lines 51, 52 form an angle with line 50 which is 45 degrees or approximately 45 degrees. Accordingly, lines 51, 52 are orthogonal to each other. To put this another way, if the handle 16 is taken to be at the "six o'clock position" on vessel 10, the pour spout 15 is at the "ten o'clock position" and not the "nine o'clock position" or "three o'clock position." Due to this arrangement of lines 51, 52, the pour spout 15 may be used to pour liquids out of cookware vessel 10 without losing any liquid through utensil handle slot 32, despite the fact that pour spout 15 and utensil handle slot 32 are on the same side of vessel 10. Other arrangements are within the scope of the subject technology.

Optionally, basket 40 is provided in cookware set 1. In an embodiment, basket 40 is made of metal wire mesh as is known in the art. Basket 4 is adapted to nest within the containing portion 11 of vessel 10. The height of basket 40 is adapted so it nests beneath utensil 30, as shown in the Figures.

It should be understood that the ornamental appearance of the cookware set, and separately the components thereof, as shown in the Figures are within the scope of the subject technology.

While specific embodiments of the invention have been shown and described in detail to illustrate the application of the principles of the invention, it will be understood that the invention may be embodied otherwise without departing from such principles. It will also be understood that the present invention includes any combination of the features and elements disclosed herein and any combination of equivalent features. The exemplary embodiments shown herein are presented for the purposes of illustration only and are not meant to limit the scope of the invention.

What is claimed is:
1. A cookware set comprising:
   a cookware vessel comprising a containing portion, a rim about an upper edge of the containing portion, a first handle attached at a first side of the cookware vessel, a utensil rest disposed at the upper edge of the containing portion and extending outwardly, a utensil slot disposed at the upper edge of the containing portion at a position opposite the utensil rest;
   a lid for the cookware vessel, the lid comprising a downward-extending lid rim, the lid rim formed with a utensil tool gap and a utensil handle gap opposite the utensil tool gap; and
   a utensil having a utensil handle and a utensil tool disposed at an end of the utensil handle, and a utensil handle slot extending across a width of the utensil handle;
   wherein the utensil is adapted to lay crosswise on the rim of the cookware vessel, in which position the utensil tool is received by the utensil rest, the utensil handle is received by the utensil slot, and the utensil handle slot overlays the rim of the cookware vessel at the utensil slot, so that the utensil is substantially prevented from side-to-side movement or longitudinal movement on the cookware vessel;
   wherein the lid is adapted to cover the cookware vessel and the utensil, the utensil tool gap disposed and adapted to overlay the utensil tool while it is received in utensil rest, and the utensil handle gap disposed and adapted to overlay the utensil handle while it is received in the utensil handle slot, thereby further retaining the utensil in position on the cookware vessel.

2. The cookware set of claim 1 wherein the cookware vessel comprises a pour spout and the lid rim comprises a strainer which is disposed and adapted to align with pour spout when the lid covers the cookware vessel.

3. The cookware set of claim 2 wherein the first handle is aligned along a first line, and the utensil rest and utensil slot are aligned along a second line that is not co-linear with the first line.

4. The cookware set of claim 3 wherein the pour spout is aligned along a third line that is not co-linear with the first line or the second line.

5. The cookware set of claim 4 wherein second line and third line are orthogonal.

6. The cookware set of claim 1 wherein the cookware vessel comprises a second handle attached at a second side of the cookware vessel opposite the first side and first handle.

7. The cookware set of claim 1 further comprising a basket adapted to nest within the containing portion of the cookware vessel and beneath the utensil.

8. The cookware set of claim 1 wherein a portion of the rim extends around a perimeter of the utensil rest.

9. The cookware set of claim 1 wherein a plurality of bumps is disposed about an inner surface of the lid.

10. The set of claim 1 wherein the utensil is a spatula, spoon, spoonula, fork, turner, or flipper.

11. A set of range-top cookware for household or commercial use, the set comprising:
a cookware vessel comprising a containing portion, a rim about an upper edge of the containing portion, a first handle attached at a first side of the cookware vessel, a utensil rest disposed at the upper edge of the containing portion and extending outwardly and having a floor and an outer perimeter, the rim extending around the outer perimeter, a utensil slot disposed at the upper edge of the containing portion at a position opposite the utensil rest, and a pour spout;
a utensil having a utensil handle and a utensil tool disposed at an end of the utensil handle, and a utensil handle slot extending across a width of the utensil handle, wherein the utensil is adapted to lay crosswise on the rim of the cookware vessel, in which position the utensil tool is received by the utensil rest and is constrained by the floor and the portion of the rim extending around the outer perimeter of the utensil rest, the utensil handle is received by the utensil slot, and the utensil handle slot overlays the rim of the cookware vessel at the utensil slot, so that the utensil is substantially prevented from side-to-side movement or longitudinal movement on the cookware vessel;
a lid adapted to cover the cookware vessel, the lid comprising a downward-extending lid rim, the lid rim formed with a utensil tool gap and a utensil handle gap opposite the utensil tool gap, the utensil tool gap disposed and adapted to overlay the utensil tool while it is received in utensil rest, and the utensil handle gap disposed and adapted to overlay the utensil handle while it is received in the utensil handle slot, thereby further constraining and retaining the utensil in position on the cookware vessel, the lid rim also formed with a strainer which is disposed and adapted to align with pour spout when the lid is placed on the cookware vessel.

12. The set of claim 11 wherein the cookware vessel further comprises a second handle attached at a second side of the cookware vessel opposite the first side.

13. The set of claim 11 further comprising a wire-mesh basket adapted to nest within the containing portion of the cookware vessel and beneath the utensil.

14. The set of claim 11 wherein the first handle is aligned along a first line, the utensil rest and utensil slot are aligned along a second line that is not co-linear with the first line, and the pour spout is aligned along a third line that is not co-linear with the first line or the second line.

15. The set of claim 14 wherein the second line and third line are orthogonal.

16. The set of claim 14 wherein the first line, second line and third line intersect at a center of the cookware vessel.

17. The set of claim 11 wherein the utensil is a spatula, spoon, spoonula, fork, turner, or flipper.

18. A cookware vessel comprising:
a containing portion, a rim about an upper edge of the containing portion, a first handle attached at a first side of the cookware vessel, a utensil rest disposed at the upper edge of the containing portion and extending outwardly, a utensil slot disposed at the upper edge of the containing portion at a position opposite the utensil rest;
the utensil rest and utensil slot adapted and disposed to receive and hold a utensil having a utensil handle and a utensil tool disposed at an end of the utensil handle and a utensil handle slot extending across a width of the utensil handle, the utensil laying crosswise on the rim of the cookware vessel, in which position the utensil tool is received by the utensil rest, the utensil handle is received by the utensil slot, and the utensil handle slot overlays the rim of the cookware vessel at the utensil slot, so that the utensil is substantially prevented from side-to-side movement or longitudinal movement on the cookware vessel;
wherein the first handle is aligned along a first line, the utensil rest and utensil slot are aligned along a second line that is not co-linear with the first line.

19. The cookware vessel of claim 18 further comprising a pour spout aligned along a third line that is not co-linear with the first line or the second line.

20. The cookware vessel of claim 19 wherein second line and third line are orthogonal.

* * * * *